US007538669B2

(12) United States Patent
Kashiwagi et al.

(10) Patent No.: US 7,538,669 B2
(45) Date of Patent: May 26, 2009

(54) WIRELESS SENSOR SYSTEM

(75) Inventors: Kazuhiro Kashiwagi, Tokyo (JP); Hiroyuki Koide, Tokyo (JP); Yasushi Kikukawa, Tokyo (JP); Takao Shinohara, Tokyo (JP)

(73) Assignee: Kowa Company, Ltd., Aichi (JP)

( * ) Notice: Subject to any disclaimer, the term of this patent is extended or adjusted under 35 U.S.C. 154(b) by 525 days.

(21) Appl. No.: 11/497,856

(22) Filed: Aug. 1, 2006

(65) Prior Publication Data

US 2007/0171051 A1 Jul. 26, 2007

(30) Foreign Application Priority Data

Jan. 23, 2006 (JP) ............................ 2006-013516

(51) Int. Cl.
*G08B 1/08* (2006.01)
*G08B 29/00* (2006.01)
*H04B 17/00* (2006.01)

(52) U.S. Cl. ............................ 340/539.16; 340/539.1; 340/539.21; 340/514; 340/501; 455/115.4

(58) Field of Classification Search ............ 340/539.16
See application file for complete search history.

(56) References Cited

U.S. PATENT DOCUMENTS 5,828,300 A * 10/1998 Addy et al. ............ 340/539.16
6,127,936 A * 10/2000 Gendel et al. ............... 340/692
6,288,639 B1 * 9/2001 Addy ...................... 340/539.3

FOREIGN PATENT DOCUMENTS

JP H10-326384 12/1998

* cited by examiner

*Primary Examiner*—Donnie L Crosland
(74) *Attorney, Agent, or Firm*—Duane Morris LLP

(57) ABSTRACT

A wireless sensor system according to the invention has a wireless sensor device for detecting something and a wireless base station for exchanging data with the wireless sensor device by wireless. The wireless sensor device 2 has a sampling signal transmitting portion for transmitting a sampling signal, and the wireless base station has a sensitivity detecting portion for detecting a receive sensitivity of the sampling signal, and a sensitivity transmitting portion for transmitting a result detected thereby to the wireless sensor device. And, the wireless sensor device has at least one of a LED and a buzzer for informing of the receive sensitivity on the basis of data from the sensitivity transmitting portion. A worker who tries to locate the wireless sensor device can easily know the best place for location with the LED or the like.

5 Claims, 5 Drawing Sheets

WIRELESS SENSOR SYSTEM

BACKGROUND OF THE INVENTION

The invention relates to a wireless sensor system for exchanging data between a wireless sensor device and a wireless base station by wireless.

In recent years, a wireless sensor system for transmitting various data detected by a sensor, such as data concerning temperature, illuminance, acceleration, magnetism, rainfall and snowfall by wireless, to a wireless base station by wireless has been used in various kinds of fields (see a Japanese patent application publication number of which is H10-326384).

FIG. 7 is a typical view showing one example of a structure of a conventional wireless sensor system. A reference numeral 120 of FIG. 7 denotes a sensor which is located at each place, such as a sensor for detecting invaders and a sensor for detecting fire, and a reference numeral 121 denotes a transmitter for transmitting information detected by the sensor 120 with a wireless signal, and a sensor device 102 is comprised of the sensor 120 and the transmitter 121. And, a reference numeral 103 denotes a controller for centralized control, and a reference numeral 104 denotes a radio relay for wireless relay from the transmitter 121 to the controller 103.

A reference numeral 105 denotes a portable wireless communication machine to be used at a time of a communication test of the sensor 120, and displays information detected by the sensor 120 thereon when transmitting a test request signal to the controller 103 and receiving a sensor test result signal from the controller 103.

Since the information detected by the sensor 120 is displayed on a display portion of the portable wireless communication machine 105 in the above-mentioned machine, it is not necessary to provide each sensor 102 with a display portion, such as a liquid crystal panel, and a cost and a power consumption of each sensor 102 can be reduced thereby. Besides, a communication condition can be known on the sensor 102 side (not on the controller 103 side) and the sensor can be easily located if a worker who is going to locate the sensor 102 has the portable wireless communication machine 105 in hand.

But, a problem of the cost remains when using the portable wireless communication machine 105. If many sensors 102 should be located at various kinds of places far away from the controller 103, for instance, it is necessary for each worker to have the portable wireless communication machine 105 in hand, and an additional cost is incurred thereby.

An object of the invention is to provide a wireless sensor system for solving the above-mentioned problems.

SUMMARY OF THE INVENTION

One aspect of the invention is wireless sensor system having a wireless sensor device and a wireless base station, for exchanging data by wireless, comprising:

said wireless sensor device having a sensor portion for detecting something, a wireless transmitting and receiving portion for exchanging data with said wireless base station, a sampling signal transmitting portion for transmitting a sampling signal to said wireless base station, a CPU, and at least one of a buzzer and a LED; and said wireless base station having a wireless transmitting and receiving portion for exchanging said data with said wireless sensor device, a sensitivity detecting portion for detecting a receive sensitivity of said sampling signal from said sampling signal transmitting portion, and a sensitivity transmitting portion for transmitting a result detected by said sensitivity detecting portion to said wireless sensor device;

whereby said CPU of said wireless sensor device informs of said receive sensitivity level on the basis of said data from said sensitivity transmitting portion through at least one of said buzzer and said LED.

The other aspect of the invention is the wireless sensor system according to claim 1, wherein said wireless sensor device has a first timer portion which starts to count followed by transmission of said sampling signal, said sampling signal transmitting portion repeats to transmit said sampling signals on the basis of counting by said first time portion when not receiving said data from said sensitivity transmitting portion, said wireless sensor device has a transmitting frequency detecting portion for detecting a frequency of transmission, and said CPU of said wireless sensor device informs of said receive sensitivity level on the basis of said data from said sensitivity transmitting portion and a result detected by said transmitting frequency detecting portion through at least one of said buzzer and said LED.

Another aspect of the invention is the wireless sensor system according to claim 1 wherein said wireless sensor device is structured to be able to be switched into a first mode for normal measurement and a second mode for examining a received sensitivity level on the basis of a transmission of said sampling signal, and said wireless sensor device has a second timer portion which starts to count followed by switching into said second mode and is reset and starts to newly count whenever receiving return of said detected result from said sensitivity transmitting portion, and finishes said second mode and returns to said first mode if said second timer portion counts a predetermined time without receiving said detected result from said sensitivity transmitting portion.

Another aspect of the invention is the wireless sensor system according to claim 3, wherein said wireless base station has a third timer portion which starts to count followed by switching into said second mode and is reset and starts to newly count whenever receiving return of said detected result from said sensitivity transmitting portion, and finishes said second mode and returns to said first mode if said third timer portion counts a predetermined time without receiving said return of said detected result.

Another aspect of the invention is the wireless sensor system according to claim 1, wherein said wireless base station has a sampling signal transmitting portion for transmitting said sampling signal to said wireless sensor device, said wireless sensor device has a sensitivity detecting portion for detecting a receive sensitivity of said sampling signal, and said CPU of said wireless sensor device informs of said receive sensitivity level on the basis of said data from said sensitivity detecting portion through at least one of said buzzer and said LED.

According to these aspects of the invention, the level of receive sensitivity can be known on the wireless sensor device side, and a worker who is on the wireless sensor device can easily and effectively know the best place for location of the device (the most optimal place for good communication condition). Besides, it is sufficient for the wireless sensor device to provide the buzzer or the LED having simple structure without a display having complicated structure, such as a liquid crystal panel, and the cost thereof can be reduced thereby.

DESCRIPTION OF THE PREFERRED EMBODIMENTS

Figure 1:
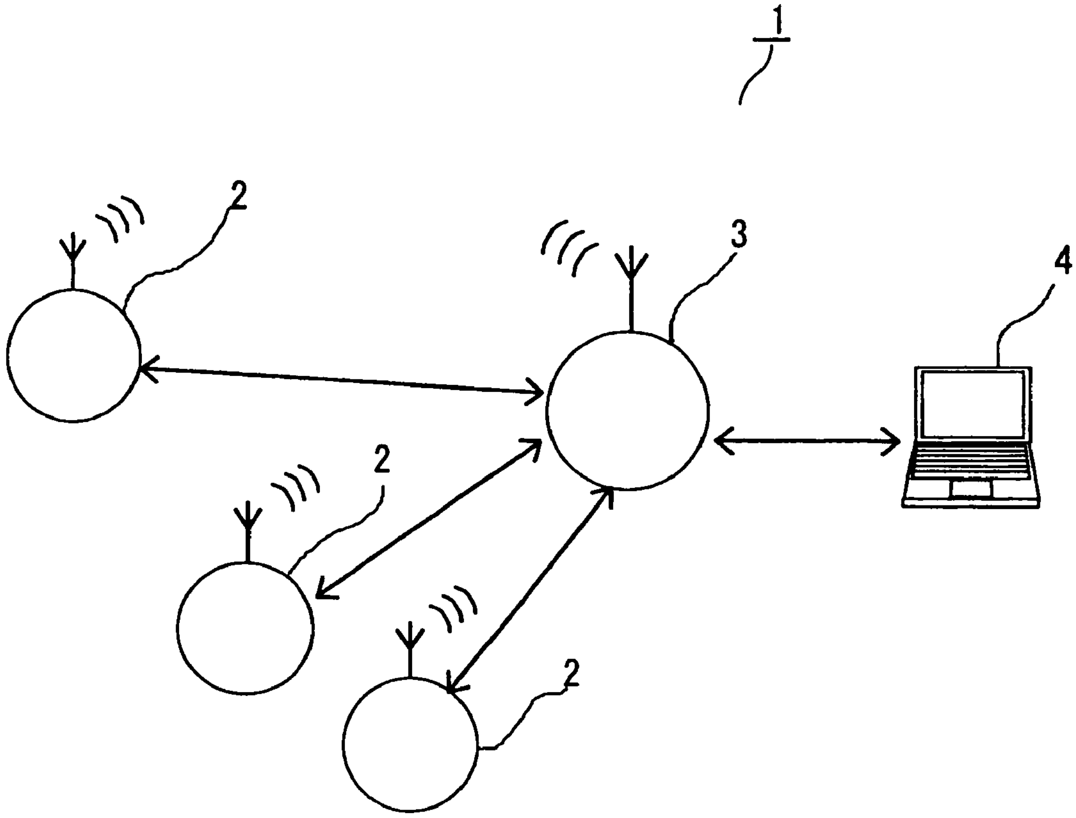
FIG. 1 is a schematic view showing one example of the whole formation of a wireless sensor system according to the invention.

The best mode of an embodiment for executing the invention will now be explained, referring to FIGS. 1 trough 3, hereinafter. FIG. 1 is a schematic view showing one example of the whole formation of a wireless sensor system according to the invention, FIG. 2 is a block diagram indicating one example of a formation of a wireless sensor device, and FIG. 3 is a block diagram indicating one example of a formation of a wireless base station.

A wireless sensor system according to the invention exemplarily illustrated with a reference numeral 1 in FIG. 1 for exchanging data by wireless has a wireless sensor device 2 and a wireless base station 3.

Figure 2:
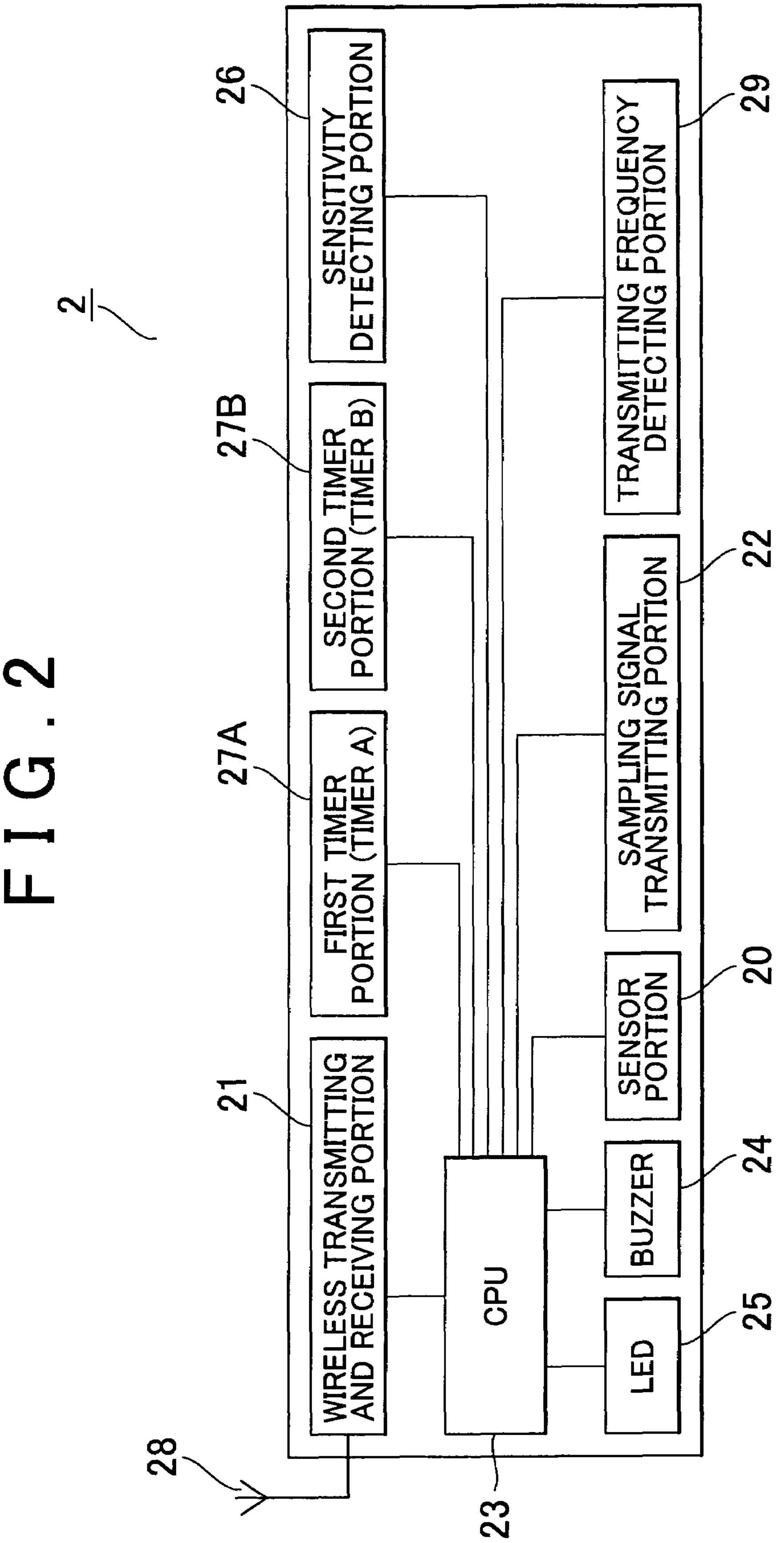
FIG. 2 is a block diagram indicating one example of a formation of a wireless sensor device.

As shown in FIG. 2, the wireless sensor device 2 is provided with a sensor portion 20 for detecting something, a wireless transmitting and receiving portion 21 (which is referred to as "the sensor-side transmitting and receiving portion" hereinafter) for exchanging data with the wireless base station 3, a sampling signal transmitting portion 22 for transmitting a sampling signal to the wireless base station 3, a CPU 23, and at least one of a buzzer 24 and a LED 25.

Figure 3:
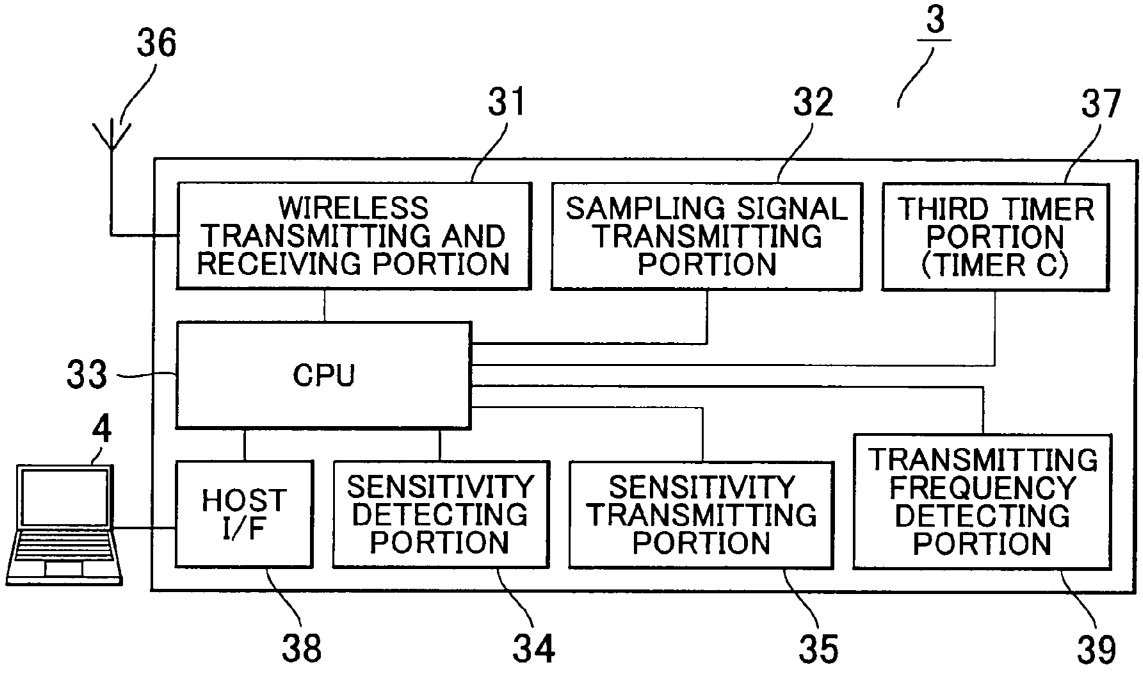
FIG. 3 is a block diagram indicating one example of a formation of a wireless base station.

As shown in FIG. 3, the wireless base station 3 is provided with a wireless transmitting and receiving portion 31 (referred to as "the base-side transmitting and receiving portion" hereinafter) for exchanging data with the wireless sensor device 2, a sensitivity detecting portion 34 for detecting receive sensitivity of the sampling signal from the sampling signal transmitting portion 22, and a sensitivity transmitting portion 35 for transmitting the results detected by the sensitivity detecting portion 34 to the wireless sensor device 2.

According to the invention, when the sampling signal is transmitted from the wireless sensor device 2 to the wireless base station 3, the sensitivity detecting portion 34 of the wireless base station 3 detects a receive sensitivity and the sensitivity transmitting portion 35 sends the detected result to the wireless sensor device 2. In the invention, the CPU 23 of the wireless sensor device 2 informs of a level of the receive sensitivity on the basis of the data from the sensitivity transmitting portion 35 through at least one of the buzzer 24 and the LED 25, thereby noticing the level of the receive sensitivity on the wireless sensor device 2 side and knowing the best position for setting up the wireless sensor device (the best position for setting-up in a good state of communication) easily and efficiently for workers being on the wireless sensor device 2 side. Besides, it is not necessary to provide the wireless sensor device 2 with a display having a complicated formation, such as a liquid crystal panel, and it is enough to provide the buzzer or the LED having a simple formation, so that the cost for the wireless sensor device 2 can be reduced thereby.

And, the wireless base station 3 may have a sampling signal transmitting portion 32 for transmitting the sampling signal to the wireless sensor device 2, and the wireless sensor device 2 may have a sensitivity detecting portion 26 for detecting a receive sensitivity of the sampling signal so that the CPU 23 of the wireless sensor device 2 can inform of the level of the receive sensitivity through at least one of the buzzer 24 and the LED 25 on the basis of the data from the sensitivity detecting portion 26.

And, the wireless sensor device 2 has a first timer portion 27A that starts to count followed by a transmission of the sampling signal from the wireless sensor device 2 to the wireless base station 3. In a case where the data from the sensitivity transmitting portion 35 is not received, the sampling signal transmitting portion 22 repeats to transmit the sampling signals on the basis of the counting by the first timer portion 27A (see S25→S27→S26 →S24 in FIG. 5). The wireless sensor device 2 has a transmitting frequency detecting portion 29 for detecting a frequency of signal transmission. The CPU 23 of the wireless sensor device 2 may inform of the level of the receive sensitivity on the basis of the data from the sensitivity transmitting portion 35 and the results detected by the transmitting frequency detecting portion 29 through at least one of the buzzer 24 and the LED 25.

The wireless sensor device 2 is composed to be able to be switched into a first mode for normal measurement or a second mode for examining the level of the receive sensitivity by the transmission of the sampling signal. The wireless sensor device 2 may have a second timer portion 27B, which starts to count followed by switching into the second mode, and which is reset every time receiving the detected results from the sensitivity transmitting portion 35 and newly starts to count so that the second mode finishes and the mode is switched into the first mode in a case where the second timer portion 27B counts a predetermined time without receiving the detected results from the sensitivity transmitting portion 35. In such a case, the second timer portion 27B repeats the reset while the sampling signal is transmitted to the wireless base station 3 and the detected results is returned to the wireless sensor device 2, so that the second mode continues.

Then, the wireless base station 3 may have a third timer portion 37, which starts to count followed by switching into the second mode, and which is reset every time returning the detected results from the sensitivity transmitting portion 35 and newly starts to count so that the second mode finishes and the mode is switched into the first mode in a case where the third timer portion 37 counts a predetermined time without returning the detected result.

In this embodiment, there constructed the wireless sensor system as shown in FIG. 1 through FIG. 3. The following is a concrete explanation.

The wireless sensor system 1 according to the invention as indicated in FIG. 1 is comprised of two or more wireless sensor devices 2 and the sensor base station 3 (a wireless base station) for exchanging data with each wireless sensor device 2 by wireless.

Each wireless sensor device 2 indicated in FIG. 2 is comprised of a sensor portion 20, a CPU 23, a sensor-side transmitting and receiving portion 21 (a wireless transmitting and receiving portion) for exchanging data with the sensor base station 3, an antenna 28, a buzzer 24, a LED 25, and a battery (not shown). Control software is built in the CPU 23 in order to control the sensor-side transmitting and receiving portion 21 and to process the sensor portion 20 thereby. The CPU 23 processes values measured by the sensor portion 20, and sends the measured values from the sensor-side transmitting and receiving portion 21 to the sensor base station 3. Preferably, the frequency of the transmitting the measured value to the sensor base station 3 may be changed according to kinds of measurement data. For example, the data may transmitted at predetermined time intervals (e.g. 10 minutes) when measuring temperature or illuminance, an amount of which does not frequently change. And, the data may be transmitted at all times when measuring acceleration or magnetism, an amount of which instantly changes.

The sensor base station 3, indicated in FIG. 3, is provided with the base station-side transmitting and receiving portion 31 (a wireless transmitting and receiving portion) for exchanging data with each sensor device 2, an antenna 36, and a CPU 33. And the sensor base station 3 is provided with a host I/F 38 in order to connect a personal computer 4 therewith.

The wireless sensor device 2 has the sampling signal transmitting portion 22 so that a constant level of the sampling signal can be transmitted to the sensor base station 3. And, the sensor base station 3 is provided with the sensitivity detecting portion 34 for detecting the receive sensitivity of the sampling signal and the sensitivity transmitting portion 35 for transmitting the detected result to the wireless sensor device 2. And, a function of detecting the receive sensitivity can be exercised when using a function built in a wireless communication chip. Since the base station-side transmitting and receiving portion 31 has a function of detecting the receive level in this embodiment, the base station-side transmitting and receiving portion 31 can be substituted for the sensitivity detecting portion 34. And, the CPU obtains data of received level for each receiving, and the data can be transmitted to the personal computer 4 together with communication data. Moreover, the CPU 23 of the wireless sensor device 2 informs of the level of receive sensitivity through the buzzer 24 and the LED 25 on the basis of the data from the sensitivity transmitting portion 35. Concretely speaking, by changing a frequency of a drive pulse which is supplied from the CPU 23, a tone (pitch) of the buzzer 24 is changeable into high (6 kHz), middle (3 kHz), or low (1 kHz) so that it is possible to know the receive sensitivity by the tone (details will follow). And, by composing the LED 25 of a red LED and a green LED, it is possible to indicate red, green, and orange with the combination of lightening, and it is possible to know the receive sensitivity by the colors (details will follow).

Also, the sensor base station 3 has the sampling signal transmitting portion 32 so that a constant level of the sampling signal can be transmitted to the wireless sensor device 2. And, the wireless sensor device 2 has the sensitivity detecting portion 26 for detecting the sensitivity by receiving the sampling signal. Moreover, the CPU 23 obtains data of the received level every time receiving the signal from the sensor base station 3, and the obtained data can be stored in a memory (not shown).

Control software is built in the CPU 23 of the sensor base station 3 in order to control the base station-side transmitting and receiving portion 31 and the host I/F 38.

And, a power of the sensor base station 3 is remained on in order to receive the data from each wireless sensor device 2 at any time.

In this embodiment, each wireless sensor device 2 is composed to be changed into "a normal mode (a first mode)" for normal measurement, and "an installation mode (a second mode)" for examining whether a condition of communication is good or not in installing the wireless sensor device 2. Following is an explanation of an effect in the installation mode, with FIG. 4 and FIG. 5.

It is assumed that the wireless sensor device 2 is in the normal mode (see S21 of FIG. 5) in a state of transmitting information to the sensor base station 3 one after another.

Figure 4:
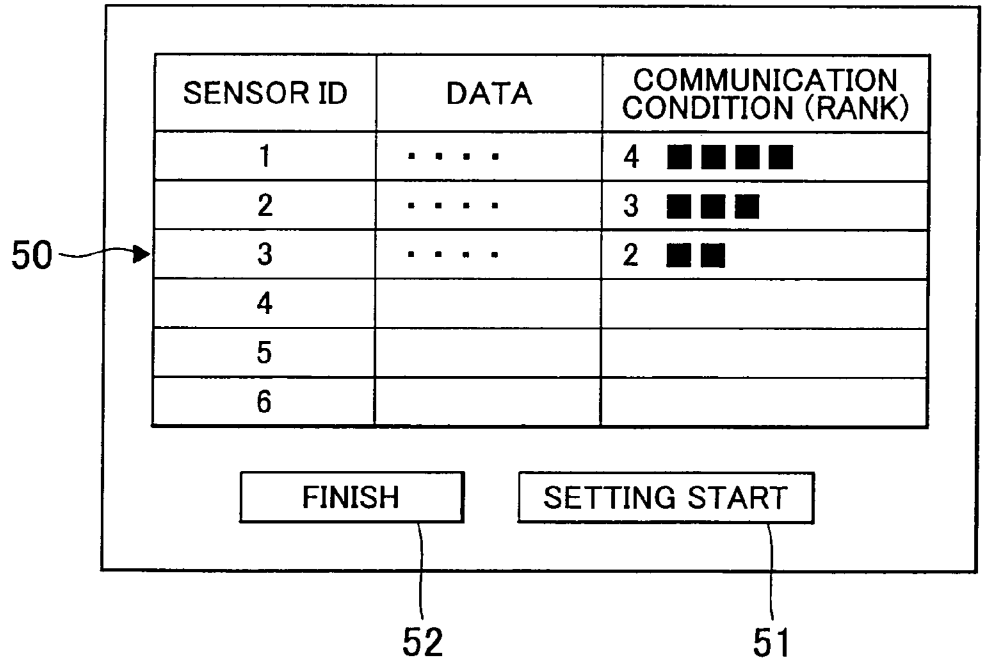
FIG. 4 is a typical view showing one example of an image displayed on a monitor screen of a personal computer.
Figure 5:
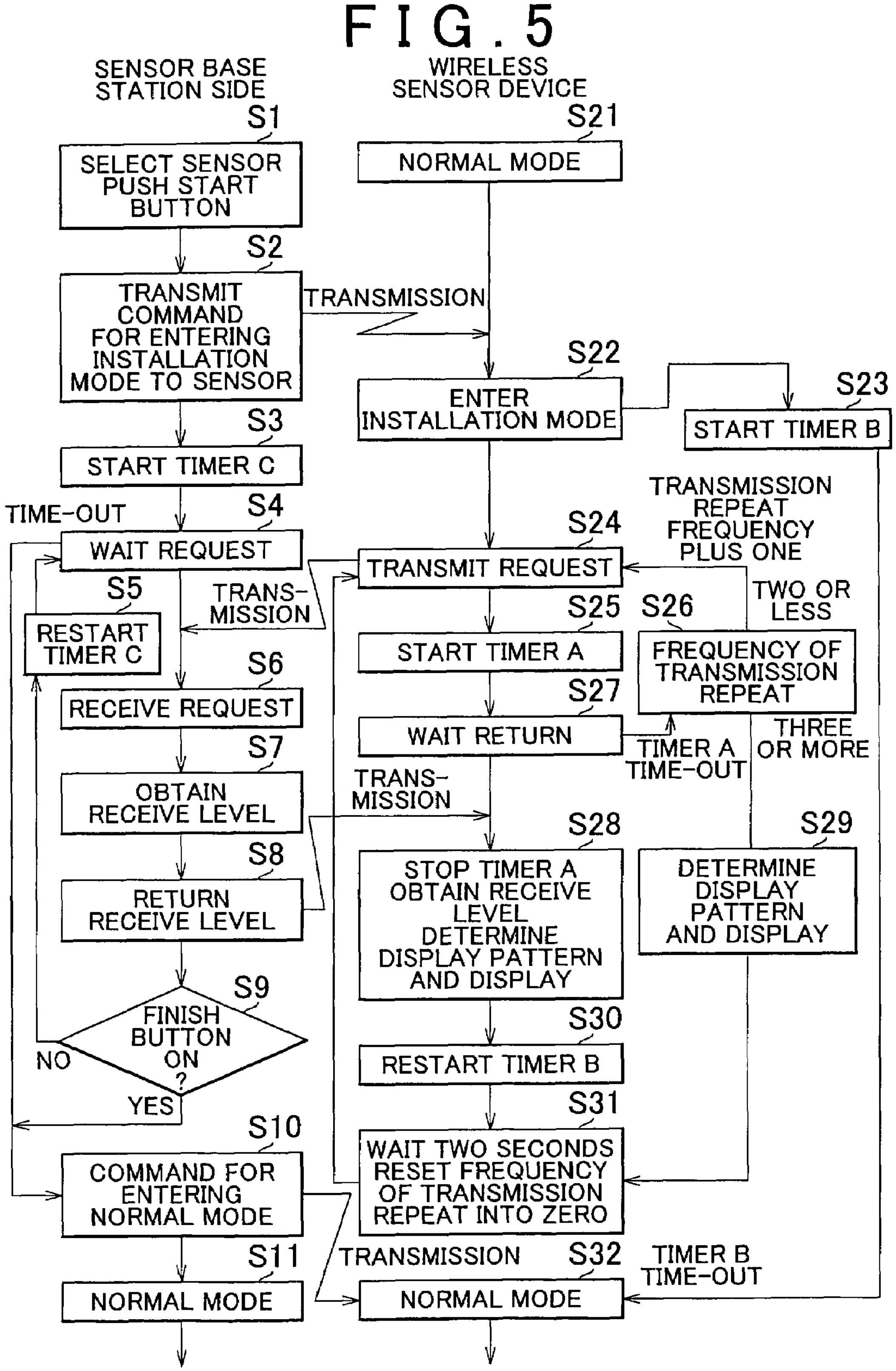
FIG. 5 is a flowchart for explaining effects of the wireless sensor system according to the invention.

In the above-mentioned state, a chart as shown in FIG. 4 and the like are displayed on a monitor screen of the personal computer 4, and the sensor device which is needed to be the installation mode (that is, "a sensor ID" on the screen) is selected through a cursor 50, and a "set-up start" button 51 on the monitor screen is clicked (see S1 of FIG. 5). Then, the sensor base station 3 transmits a command (for entering the installation mode) to the selected sensor device 2 (see S2 of FIG. 5).

Receiving the command (for entering the installation mode), the sensor device 2 enters the installation mode (see S22 of FIG. 5), and transmits a request to the sensor base station 3 (see S24). And, the timer B (the second timer portion) starts to count when entering the installation mode (see S23).

There are some cases where the request command is not received from the sensor base station 3 because of an influence of strength of an electric wave. In such a case, the timer A (the first timer portion) starts when the wireless sensor device 2 transmits the request (see S25). The request is transmitted again in such a case where no request return command is received after passing a predetermined time (0.5 seconds) and a frequency of the transmission repeat is two times or less (see S27→S26→S24). This frequency of transmission repeat is stored in a memory which is built in the CPU, and is transmitted to the sensor base station together with the data of the receive level when transmitting the sensor data.

On the other hand, when receiving the above-mentioned request command (see S4 and S6), the sensor base station 3 obtains the level received (see S7) and transmits a command adding the received level thereon (a request return command) to the sensor device 2 (see S8).

The sensor device 2 which received the command (the request return command) determines a rank according to the data added to the command (that is, the data about the received level and the frequency of transmission repeat) and operates the buzzer 24 or the LED 25 on the basis of the above-mentioned rank (see S27 and S28).

In this embodiment, the tone height of the buzzer 24 and the color of the LED 25 indicate the received level and the frequency of transmission repeat. The concrete is shown in the following chart.

CHART 1

| rank | Level received | Frequency of transmission repeat | Tone of buzzer | LED light emitting color |
|---|---|---|---|---|
| 5 | 100 or more | 0 | middle (3 kHz) | green |
| 4 | 99-50 | 0 | middle (3 kHz) | green |
| 3 | 49-25 | 1 | low (1 kHz) | orange |
| 2 | 24 or less | 2 | low (1 kHz) | orange |
| 1 | — | 3 | high (6 kHz) | red |

For example, in a case where the received level is 200 and the frequency of repeat transmission is zero (0), the rank is 5 and a buzzer frequency is middle (3 kHz), and the LED is green. And, in a case where the received level is 20 and the frequency of transmission repeat is 2, the rank is 2 and the buzzer frequency is low (1 kHz), and the LED is orange. The rank in a communication condition is also displayed on the monitor screen of the personal computer 4 (see the rightmost column of the chart in FIG. 4). Although the sensitivity detecting portion 26 of the sensor device and the sensitivity detecting portion 34 of the sensor base station respectively measure the received level, the small value of both measured by the portions 26 and 34 is a subject of an evaluation in this embodiment. After such a measurement, the timer B is restarted (that is, the timer B is reset and is restarted to count) (see S30), and the frequency of transmission repeat is reset into zero (0) after waiting 2 seconds (see S31), and the request is started to transmit again (see S24, S25, S26, S27, S28 and S29).

On the other hand, in a case where the frequency of the transmission repeat of the request command is 3, the rank in the above-mentioned chart is "1", and the buzzer 24 rings in a high tone and the LED 25 lights in red (see S29). Subsequently, the frequency of transmission repeat is reset into zero (0) after waiting 2 seconds (see S31), and the request is started to be transmitted again (see S24, S25, S26, S27, S28 and S29).

As mentioned above, in the installation mode in this embodiment, the request command is transmitted one after another at 2-second intervals. Whenever the request command is transmitted, the buzzer 24 or the LED 25 informs of a condition of communication. Therefore, workers can search the best position of the wireless sensor device 2 on the basis of the information received at 2-second intervals. If the wireless sensor device 2 is not able to receive the request return command, the timer B continues to count and the mode returns to the normal mode after a predetermined time (see S32).

And, the sensor base station 3 starts to count through the timer C (the third timer portion) at the same time when transmitting "a command for entering the installation mode" (see S3). The timer C is reset and newly started to count every time the request return command is sent to the sensor device 2, and the mode returns to the normal mode if the request return command is not transmitted after passage of 10 minutes. (see S10). Besides, also with an end button on the monitor of the personal computer (see a rererence numeral 52 in FIG. 4), the installation mode finishes and the mode returns to the normal mode (see S9, S10 and S11 in FIG. 5).

Figure 6:
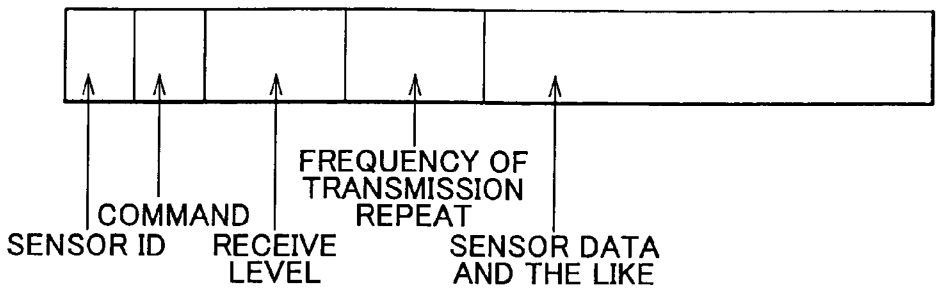
FIG. 6 is a typical view showing one example of a structure of data to be used for communication.
Figure 7:
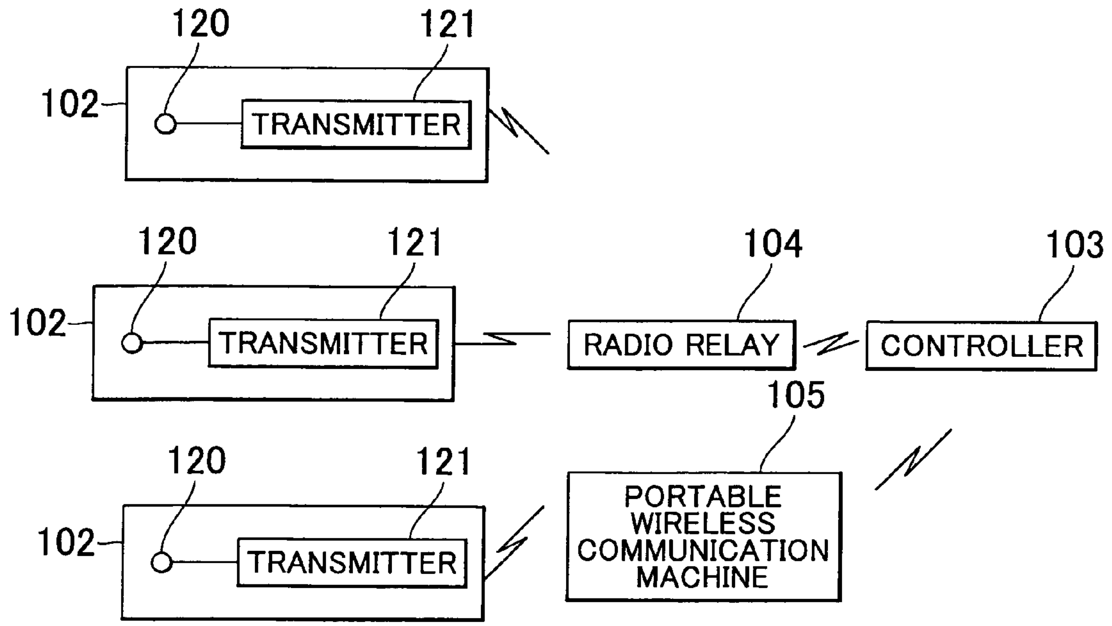
FIG. 7 is a typical view showing one example of a structure of a conventional wireless sensor system.

A structure of the data to be used for communication is indicated in FIG. 6. A sensor ID in the figure is an ID for identification of the subject sensor, and kinds of commands are indicated in the following chart. Moreover, the received level is indicated with numerals zero (0) through 255, and the frequency of transmission repeat is zero (0), 1, or 2. The measurement data with the sensor is added to the frequency of transmission repeat.

CHART 2

| | |
|---|---|
| Installation mode | 1 |
| Normal mode | 2 |
| Request | 3 |
| Request return | 4 |

And, in the flowchart of FIG. 5, only the frequency of transmission from the wireless sensor device 2 to the sensor base station 3 (that is, the frequency of the request transmission) is counted, and with the counted frequency, a communication condition is ranked. However, in addition to this method, the frequency of transmission from the sensor base station 3 to the wireless sensor device 2 may be counted. In such a case, the communication condition is preferably ranked with a bigger transmission frequency of ones from the wireless sensor device 2 to the sensor base station 3 and from the sensor base station 3 to the wireless sensor device 2.

The present invention is explained on the basis of the embodiment heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

The invention claimed is:

1. Wireless sensor system having a wireless sensor device and a wireless base station, for exchanging data by wireless, comprising:

said wireless sensor device having a sensor portion for detecting something, a wireless transmitting and receiving portion for exchanging data with said wireless base station, a sampling signal transmitting portion for transmitting a sampling signal to said wireless base station, a CPU, and at least one of a buzzer and a LED; and said wireless base station having a wireless transmitting and receiving portion for exchanging said data with said wireless sensor device, a sensitivity detecting portion for detecting a receive sensitivity of said sampling signal from said sampling signal transmitting portion, and a sensitivity transmitting portion for transmitting a result detected by said sensitivity detecting portion to said wireless sensor device;

whereby said CPU of said wireless sensor device informs of said receive sensitivity level on the basis of said data from said sensitivity transmitting portion through at least one of said buzzer and said LED.

2. The wireless sensor system according to claim 1, wherein said wireless sensor device has a first timer portion which starts to count followed by transmission of said sampling signal, said sampling signal transmitting portion repeats to transmit said sampling signals on the basis of counting by said first timer portion when not receiving said data from said sensitivity transmitting portion, said wireless sensor device has a transmitting frequency detecting portion for detecting a frequency of transmission, and said CPU of said wireless sensor device informs of said receive sensitivity level on the basis of said data from said sensitivity transmitting portion and a result detected by said transmitting frequency detecting portion through at least one of said buzzer and said LED.

3. The wireless sensor system according to claim 1 wherein said wireless sensor device is structured to be able to be switched into a first mode for normal measurement and a second mode for examining a received sensitivity level on the basis of a transmission of said sampling signal, and said wireless sensor device has a second timer portion which starts to count followed by switching into said second mode and is reset and starts to newly count whenever receiving return of said detected result from said sensitivity transmitting portion, and finishes said second mode and returns to said first mode if said second timer portion counts a predetermined time without receiving said detected result from said sensitivity transmitting portion.

4. The wireless sensor system according to claim 3, wherein said wireless base station has a third timer portion which starts to count followed by switching into said second mode and is reset and starts to newly count whenever receiving return of said detected result from said sensitivity transmitting portion, and finishes said second mode and returns to said first mode if said third timer portion counts a predetermined time without receiving said return of said detected result.

5. The wireless sensor system according to claim 1, wherein said wireless base station has a sampling signal transmitting portion for transmitting said sampling signal to said wireless sensor device, said wireless sensor device has a sensitivity detecting portion for detecting a receive sensitivity of said sampling signal, and said CPU of said wireless sensor device informs of said receive sensitivity level on the basis of said data from said sensitivity detecting portion through at least one of said buzzer and said LED.

* * * * *